United States Patent
Cheung et al.

(10) Patent No.: US 7,791,832 B1
(45) Date of Patent: *Sep. 7, 2010

(54) SELF-SERVO WRITE STITCHING SYSTEM

(75) Inventors: Man Cheung, Campbell, CA (US);
Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,264

(22) Filed: Jan. 11, 2010

Related U.S. Application Data

(63) Continuation of application No. 11/904,117, filed on Sep. 26, 2007, now Pat. No. 7,646,559.

(60) Provisional application No. 60/827,782, filed on Oct. 2, 2006.

(51) Int. Cl.
*G11B 21/02* (2006.01)
*G11B 5/09* (2006.01)
*G11B 5/596* (2006.01)

(52) U.S. Cl. .................... 360/75; 360/51; 360/77.04

(58) Field of Classification Search .................. None
See application file for complete search history.

(56) References Cited

U.S. PATENT DOCUMENTS

| | | | |
|---|---|---|---|
| 6,134,976 A | 10/2000 | Elsing | |
| 7,002,761 B1 | 2/2006 | Sutardja et al. | |
| 7,035,035 B2 | 4/2006 | Ito | |
| 7,339,761 B1 | 3/2008 | Tu et al. | |
| 7,646,559 B1 * | 1/2010 | Cheung et al. ............. | 360/75 |
| 2001/0021075 A1 | 9/2001 | Kitazaki et al. | |
| 2005/0141125 A1 | 6/2005 | Yatsu | |

* cited by examiner

*Primary Examiner*—Andrew L Sniezek

(57) ABSTRACT

A control system includes a write head and a control module configured to signal the write head to write a servo test track on a rotating medium at a position relative to a reference servo track on the rotating medium. The servo test track is written on the rotating medium subsequent to an interrupt event. The reference servo track having been written to the rotating medium prior to the interrupt event, detects the position of the servo test track relative to the reference servo track and signals the write head to write a new servo track on the rotating medium based on the detected position of the servo test track relative to the reference servo track.

20 Claims, 11 Drawing Sheets

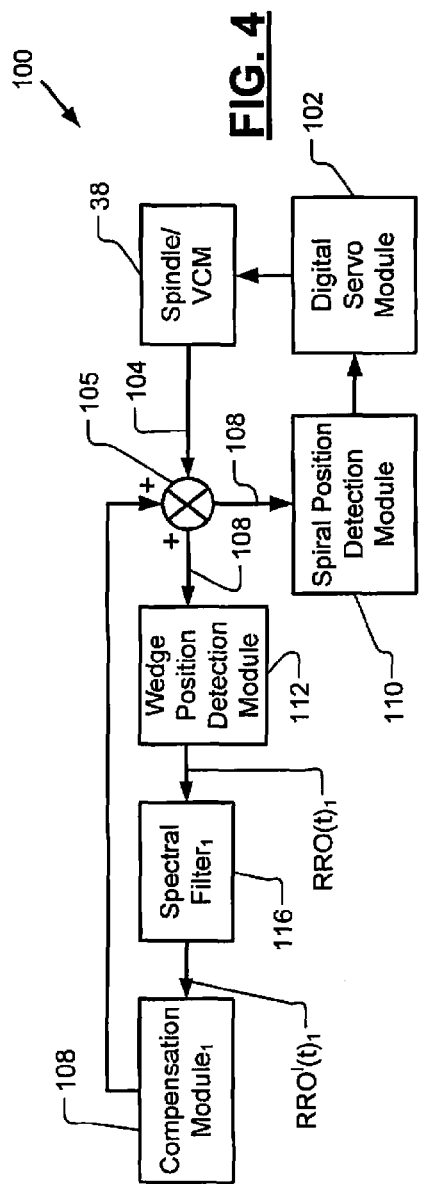
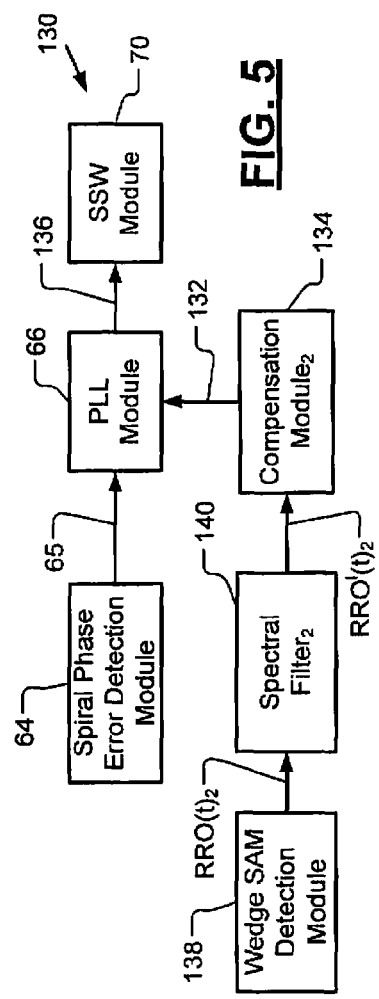
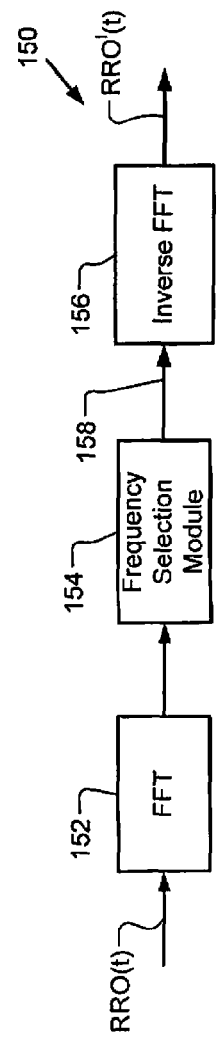
FIG. 4
FIG. 5
FIG. 6

SELF-SERVO WRITE STITCHING SYSTEM

CROSS-REFERENCE TO RELATED APPLICATIONS

This application is a continuation of U.S. patent application Ser. No. 11/904,117, filed Sep. 26, 2007, which claims the benefit of U.S. Provisional Application No. 60/827,782, filed Oct. 2, 2006. The disclosures of the above applications are incorporated herein by reference in their entirety.

FIELD

The present disclosure relates to rotating storage devices, and more particularly to disk drive servo control systems and self-servo writing techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer hard disk drives (HDDs) employ read/write heads to read and write data on magnetic layers of one or more rotating disks. The data is stored on concentric data tracks. The read/write heads are positioned at centers of the data tracks during read and write operations. The HDDs include closed-loop servo systems that position the read/write heads on the data tracks using servo information that is embedded in a dedicated portion of each data track.

Close proximity of a read/write head to a disk enables high-resolution servo patterns and user data to be recorded. The servo patterns are written in servo sectors (wedges), which are interleaved between data sectors. The servo patterns provide a servo controller with position information that enables a head positioner, such as a rotary voice coil motor, to move a read/write head from track-to-track during random access seek operations. The servo patterns also maintain the read/write head in proper alignment with a track during track following operations, when user data is read from or written to available data sectors. The servo patterns allow a read/write head to follow a centerline of both circular and non-circular tracks. For example, a track may be non-circular due to spindle wobble, disk slip and/or thermal expansion.

The servo information is written on a surface of a disk as a set of wedges (tracks) that extend radially from an inner diameter of the disk. A portion of each wedge has an automatic gain control (AGC) field, a synchronization field, an index mark, a gray-coded track number, and a set of fine-positioned offset bursts. The offset bursts are configured in an echelon across a data track. Read/write head position is adjusted relative to the center of the data track based on respective amplitudes and associated times of the offset bursts.

Traditionally, a machine referred to as a "servo writer" is used to write the servo information to a disk. The servo writer may include the following features: a massive granite base to minimize effects of vibration; precision fixtures to hold a HDD; a precision laser interferometer-based actuator mechanism to place a read/write head radially with respect to an axis of rotation of the disk; and an external clock head to position servo wedges in time. The servo writers tend to be large, expensive, and require a clean room environment. As density of the tracks on the disk increases, the time required by the servo writer to write the servo data to the disk also increases, which can create a bottleneck.

To reduce manufacturing time, a technique referred to as self-servo writing (SSW) has been developed. Servo patterns are written by a HDD during SSW without use of a traditional servo track writer. Self-servo writing involves reading position and timing information from the disk, positioning a read/write head using the position information, and writing servo patterns to the disk using the timing information.

One self-servo writing technique includes writing spiral servo tracks on a disk. The spiral servo tracks are initially written via an external servo writer. Instead of slowly writing servo information to each concentric data track on each surface of each disk in a hard drive, a limited number of spiral servo tracks are written. The spiral servo tracks are associated with a single surface of one of the HDD disks.

Without the aid of a traditional servo writer, the HDD uses timing information in the spiral servo tracks to determine a radial and circumferential position of the read/write head. The read/write head is then positioned and writes conventional servo data (servo wedges) to concentric data tracks on the disks via the servo system. Since a smaller number of spiral servo tracks are initially written, servo-writing time is reduced. Once the self-servo writing is finished, the spiral servo tracks can be overwritten by data tracks.

Another SSW technique includes the writing of sectional spiral servo tracks. For example, a HDD may write short sectional spiral servo tracks followed by conventional servo wedges that are based on the sectional spiral servo tracks. However, this may create interruptions in writing of a concentric servo pattern by design. Interruptions can also occur by accident, such as, for example, due to a power failure or a system reboot. The interruptions can cause gaps or overlapping of servo wedges. Misalignment can occur between tracks written prior to an interrupt and servo wedges written after the interrupt. For example, a new track written after an interrupt may not be properly aligned in radial and circumferential directions relative to a servo wedge written before the interrupt. Track misalignment can result in "track squeeze", which refers to differences in relative distances between servo wedges. Track squeeze can result in synchronization, track following, and track reading and writing problems.

Internal HDD servo wedge writing also suffers from self-propagation. During self-propagation, servo bursts in a previous servo wedge are used to position a read/write head as servo bursts are written to the next servo wedge. However, perturbations in the servo bursts in the previous servo wedge propagate to the servo bursts in the next servo wedge. Compound errors that propagate across the servo wedge can lead to excessive wedge non-circularity.

SUMMARY

In one embodiment, a control system is provided and includes a write head that writes servo data on a rotating medium. A control module signals the write head to write a servo test track on the rotating medium and subsequent to a reference servo track. The reference servo track is written prior to an interrupt event. The control module detects a position of the servo test track relative to the reference servo track and signals the write head to write a new servo track based on the position after the interrupt event.

In other features, the new servo track is written to match a concentric servo pattern of the reference servo track. In other features, the control module signals the write head to write the new servo track in alignment with the reference servo track. In still other features, the control module signals the write head to write the new servo track adjacent to the reference servo track without a gap therebetween.

In other features, the interrupt event includes a cease in spiral servo writing.

In yet other features, the control system further includes a position detection module that detects radial positions of the reference servo track and the servo test track. The control module writes the new servo track based on the radial positions.

In further features, the control module determines an offset value based on the position and writes the new servo track based on the offset value.

In other features, the control system further includes a position detection module that determines circumferential positions of the reference servo track and the servo test track. The control module writes the new servo track based on the circumferential positions.

In yet other features, the control system further includes a radial alignment system that determines radial repeatable run-out components of the reference servo track. The control module signals the write head to write the new servo track based on the radial repeatable run-out components.

In still other features, the control system further includes a timing alignment system that determines circumferential repeatable run-out components of the reference servo track. The control module signals the write head to write the new servo track based on the circumferential repeatable run-out components.

In other features, the control module phases out repeatable run-out compensation with newly written servo tracks. In other features, the control module determines repetitive position errors and writes new servo tracks based the errors. In further features, the control module phases out repetitive position error compensation with newly written servo tracks.

In other features, the reference servo track is written based on a partial spiral section.

In still other features, a method is provided and includes writing servo data via a write head on a rotating medium. The write head is signaled to write a servo test track on the rotating medium and subsequent to a reference servo track. The reference servo track is written prior to an interrupt event. A position of the servo test track relative to the reference servo track is detected. The write head is signaled to write a new servo track based on the position after the interrupt event.

In other features, the new servo track is written to match a concentric servo pattern of the reference servo track. In yet other features, the method includes signaling the write head to write the new servo track in alignment with the reference servo track. In other features, the method includes signaling the write head to write the new servo track adjacent to the reference servo track without a gap therebetween.

In further features, the interrupt event includes a cease in spiral servo writing.

In other features, the method further includes detecting radial positions of the reference servo track and the servo test track. The new servo track is written based on the radial positions.

In still other features, the method includes determining an offset value based on the position. The new servo track is written based on the offset value.

In other features, the method further includes determining circumferential positions of the reference servo track and the servo test track. The new servo track is written based on the circumferential positions.

In yet other features, the method further includes determining radial repeatable run-out components of the reference servo track. The write head is signaled to write the new servo track based on the radial repeatable run-out components.

In further features, the method further includes determining circumferential repeatable run-out components of the reference servo track. The write head is signaled to write the new servo track based on the circumferential repeatable run-out components.

In still other features, the method includes phasing out repeatable run-out compensation with newly written servo tracks.

In other features, the method includes determining repetitive position errors. New servo tracks are written based on the errors. In other features, the method includes phasing out repetitive position error compensation with newly written servo tracks.

In other features, the reference servo track is written based on a partial spiral section.

In still other features, a control system is provided and includes write means for writing servo data on a rotating medium. Control means for signaling the write means to write a servo test track on the rotating medium and subsequent to a reference servo track is included. The reference servo track is written prior to an interrupt event. The control means detects a position of the servo test track relative to the reference servo track and signals the write means to write a new servo track based on the position after the interrupt event.

In yet other features, the new servo track is written to match a concentric servo pattern of the reference servo track. In other features, the control means signals the write means to write the new servo track in alignment with the reference servo track. In further features, the control means signals the write means to write the new servo track adjacent to the reference servo track without a gap therebetween.

In still other features, the interrupt event includes a cease in spiral servo writing.

In other features, the control system further includes position detection means for detecting radial positions of the reference servo track and the servo test track. The control means writes the new servo track based on the radial positions.

In other features, the control means determines an offset value based on the position and writes the new servo track based on the offset value.

In other features, the control system further includes position detection means for determining circumferential positions of the reference servo track and the servo test track. The control means writes the new servo track based on the circumferential positions.

In still other features, the control system further includes a radial alignment system that determines radial repeatable run-out components of the reference servo track. The control means signals the write means to write the new servo track based on the radial repeatable run-out components.

In further features, the control system further includes timing alignment means for determining circumferential repeatable run-out components of the reference servo track. The control means signals the write means to write the new servo track based on the circumferential repeatable run-out components.

In yet other features, the control means phases out repeatable run-out compensation with newly written servo tracks. In other features, the control means determines repetitive position errors and writes new servo tracks based on the errors. In other features, the control means phases out repetitive position error compensation with newly written servo tracks.

In other features, the reference servo track is written based on a partial spiral section.

In still other features, a servo data read/write system is provided and includes a write head that writes a first servo track on a rotating storage medium before an interrupt event. A control module writes a second servo track in radial and circumferential alignment with the first servo track using the write head and after the interrupt event.

In further features, the control module radially positions the write head to write the second servo track consecutively after the first servo track and without a gap between the first servo track and the second servo track.

In yet other features, the control module writes the second servo track based on a radial position error and a timing synchronization error.

In other features, servo wedge write timing is aligned to match sync marks and bursts of the first servo track.

In still other features, the first servo track is a last written servo track prior to the interrupt event.

In other features, the servo data read/write system further includes a radial alignment system that determines radial repeatable run-out components of the first servo track. The control module signals the write head to write the new servo track based on the radial repeatable run-out components.

In other features, the servo data read/write system further includes a timing alignment system that determines circumferential repeatable run-out components of the first servo track. The control module signals the write head to write the new servo track based on the circumferential repeatable run-out components.

In further features, the control module phases out repeatable run-out compensation with newly written servo tracks.

In still other features, the control module determines repetitive position errors and writes new servo tracks based on the errors. In yet other features, the control module phases out repetitive position error compensation with newly written servo tracks.

In other features, a servo data read/write method is provided and includes writing a first servo track on a rotating storage medium before an interrupt event via a write head. A second servo track is written in radial and circumferential alignment with the first servo track using the write head and after the interrupt event.

In other features, the method includes radially positioning the write head to write the second servo track consecutively after the first servo track and without a gap between the first servo track and the second servo track.

In other features, the method includes writing the second servo track based on a radial position error and a timing synchronization error.

In still other features, servo wedge write timing is aligned to match sync marks and bursts of the first servo track.

In further features, the first servo track is a last written servo track prior to the interrupt event.

In other features, the method further includes determining radial repeatable run-out components of the first servo track. The write head is signaled to write the new servo track based on the radial repeatable run-out components.

In yet other features, the method further includes determining circumferential repeatable run-out components of the first servo track. The write head is signaled to write the new servo track based on the circumferential repeatable run-out components.

In still other features, the method includes phasing out repeatable run-out compensation with newly written servo tracks.

In other features, the method includes determining repetitive position errors and writing new servo tracks based on the errors. In other features, the method includes phasing out repetitive position error compensation with newly written servo tracks.

In further features, a servo data read/write system is provided and includes write means for writing a first servo track on a rotating storage medium before an interrupt event. Control means for writing a second servo track in radial and circumferential alignment with the first servo track using the write means and after the interrupt event is included.

In yet other features, the control means radially positions the write means to write the second servo track consecutively after the first servo track and without a gap between the first servo track and the second servo track.

In other features, the control means writes the second servo track based on a radial position error and a timing synchronization error.

In still other features, servo wedge write timing is aligned to match sync marks and bursts of the first servo track.

In other features, the first servo track is a last written servo track prior to the interrupt event.

In other features, the control system further includes radial alignment means for determining radial repeatable run-out components of the first servo track. The control means signals the write means to write the new servo track based on the radial repeatable run-out components.

In further features, the control system further includes timing alignment means that determines circumferential repeatable run-out components of the first servo track. The control means signals the write means to write the new servo track based on the circumferential repeatable run-out components.

In still other features, the control means phases out repeatable run-out compensation with newly written servo tracks.

In yet other features, the control means determines repetitive position errors and writes new servo tracks based on the errors. In other features, the control means phases out repetitive position error compensation with newly written servo tracks.

In other features, a control system is provided and includes a write head that writes servo data on a rotating medium. A control module determines location of a reference servo track on the rotating medium. The reference servo track is written before an interrupt event. The control module writes a servo test track in a blank area of the rotating medium, compares position of the servo test track with the reference servo track to generate a position error, and writes a new servo track based on the position error.

In further features, the control module writes the new servo track to match a concentric servo pattern of the reference servo track. In still other features, the control module writes the new servo track to match a signature of the reference servo track. In yet other features, the control module writes the new servo track to match a direct current (DC) and alternating current (AC) signature of the reference servo track.

In other features, the control module performs the comparison and the writing of the new servo track while a self-servo write clock is phase locked to spiral track sync marks.

In other features, the control module detects radial positions of the reference servo track and the servo test track and writes the new servo track based on the radial positions.

In other features, the control module determines an offset value and writes the new servo track based on the offset value.

In other features, the control module determines circumferential positions of the reference servo track and the test track and writes the new servo track based on the circumferential positions.

In still other features, the control module determines radial repeatable run-out components of the reference servo track and writes the new servo track based on the radial repeatable run-out components.

In further features, the control module determines circumferential repeatable run-out components of the reference servo track and writes the new servo track based on the circumferential repeatable run-out components.

In yet other features, the control module phases out repeatable run-out compensation with newly written servo tracks.

In other features, the control module determines repetitive position errors and writes new servo tracks based on the repetitive position errors. In still other features, the control module phases out repetitive position error compensation with newly written servo tracks.

In other features, a method is provided and includes writing servo data on a rotating medium via a write head. Location of a reference servo track on said rotating medium is determined. The reference servo track is written before an interrupt event. A servo test track is written in a blank area of the rotating medium. Position of the servo test track is compared with the reference servo track to generate a position error. A new servo track is written based on the position error.

In other features, the method includes writing the new servo track to match a concentric servo pattern of the reference servo track. In further features, the method includes writing the new servo track to match a signature of the reference servo track. In still other features, the method includes writing the new servo track to match a direct current (DC) and alternating current (AC) signature of the reference servo track.

In yet other features, the method includes performing the comparison and the writing of the new servo track while a self-servo write clock is phase locked to spiral track sync marks.

In other features, the method includes detecting radial positions of the reference servo track and the servo test track. The new servo track is written based on the radial positions.

In other features, the method includes determining an offset value and writes the new servo track based on the offset value.

In other features, the method includes determining circumferential positions of the reference servo track and the test track. The new servo track is written based on the circumferential positions.

In still other features, the method includes determining radial repeatable run-out components of the reference servo track. The new servo track is written based on the radial repeatable run-out components.

In further features, the method includes determining circumferential repeatable run-out components of the reference servo track. The new servo track is written based on the circumferential repeatable run-out components.

In other features, the method includes phasing out repeatable run-out compensation with newly written servo tracks.

In yet other features, the method includes determining repetitive position errors and writes new servo tracks based on the repetitive position errors. In still other features, the method includes phasing out repetitive position error compensation with newly written servo tracks.

In other features, a control system includes write means for writing servo data on a rotating medium. Control means for determining location of a reference servo track on the rotating medium. The reference servo track is written before an interrupt event. The control means writes a servo test track in a blank area of the rotating medium, compares position of the servo test track with the reference servo track to generate a position error, and writes a new servo track based on the position error.

In further features, the control means writes the new servo track to match a concentric servo pattern of the reference servo track. In other features, the control means writes the new servo track to match a signature of the reference servo track. In other features, the control means writes the new servo track to match a direct current (DC) and alternating current (AC) signature of the reference servo track.

In yet other features, the control means performs the comparison and the writing of the new servo track while a self-servo write clock is phase locked to spiral track sync marks.

In still other features, the control means detects radial positions of the reference servo track and the servo test track and writes the new servo track based on the radial positions.

In other features, the control means determines an offset value and writes the new servo track based on the offset value.

In further features, the control means determines circumferential positions of the reference servo track and the test track and writes the new servo track based on the circumferential positions.

In other features, the control means determines radial repeatable run-out components of the reference servo track and writes the new servo track based on the radial repeatable run-out components.

In other features, the control means determines circumferential repeatable run-out components of the reference servo track and writes the new servo track based on the circumferential repeatable run-out components.

In still other features, the control means phases out repeatable run-out compensation with newly written servo tracks.

In yet other features, the control means determines repetitive position errors and writes new servo tracks based on the repetitive position errors. In further features, the control means phases out repetitive position error compensation with newly written servo tracks.

In still other features, the systems and methods described above may be implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram illustrating a radial servo wedge alignment system in accordance with an embodiment of the present disclosure;

FIG. 5 is a functional block diagram illustrating a servo wedge phase and timing alignment system in accordance with an embodiment of the present disclosure;

FIG. 6 is a functional block diagram of an example spectral filter in accordance with an embodiment of the present disclosure;

DETAILED DESCRIPTION

Figure 1:
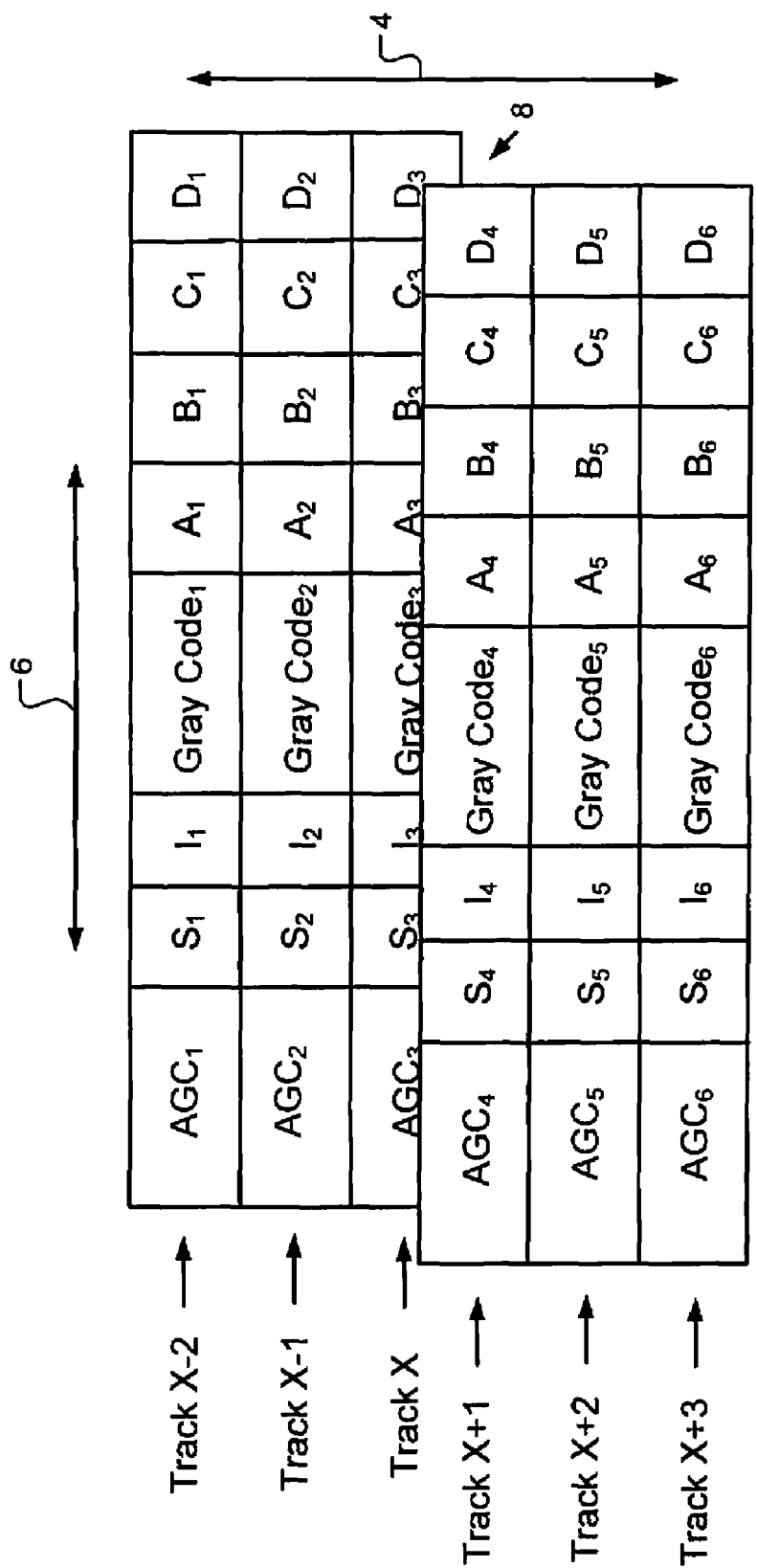
FIG. 1 is a servo wedge diagram illustrating wedge misalignment.

The following description is merely exemplary in nature and is in no way intended to limit the disclosure, its application, or uses. For purposes of clarity, the same reference numbers will be used in the drawings to identify similar elements. As used herein, the terms module and state machine refer to Application Specific Integrated Circuits (ASICs), electronic circuits, processors (shared, dedicated, or grouped) and memories that execute one or more software or firmware programs, combinational logic circuits, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Host devices such as computers, laptops, personal video recorders (PVRs), MP3 players, game consoles, servers, set-top boxes, digital cameras, and/or other electronic devices often need to store a large amount of data. Rotating data storage devices may be used to meet these storage requirements. For example, a rotating data storage device may be a hard disk drive (HDD), a compact disc (CD) drive, a digital versatile disc (DVD) drive or a high definition/high data storage disc drive.

With respect to HDDs, data is typically written on platters in concentric circles called tracks. The tracks are divided radially into multiple sectors. Before performing a read or a write operation on a sector of a track, a head locks onto the track based on positioning information, which is referred to as "servo" or "servo data" that is generally prewritten on the platters. The servo data is defined by servo wedges that provide positioning information for read and write operations. Traditionally, the servo wedges are prewritten in multiple sectors using a special servo writing apparatus when a disk drive is manufactured. The traditional servo writing methods, however, become impractical as the track density increases for a disk drive. More recently, track density has increased as the demand for storage capacity and spin rates of disk drives have increased.

Accordingly, disk drives increasingly use self-servo-write (SSW) methods to write servo wedges, in the form of patterns, using the same read/write heads that are used to read/write regular data. When writing servo wedges using the SSW methods, the heads typically lock onto reference servo sectors (RSS) that are prewritten on the platters in the form of reference spiral patterns. For a more detailed understanding of spiral sector tracks and sector servo tracks see, for example, Sutardja et al. U.S. Pat. No. 7,002,761 B1 entitled, "Demodulation Compensation for Spiral Servo Tracks in Hard Disk Drives", which is incorporated herein by reference in its entirety. The spiral patterns may be written in sections and during different writing sessions.

Interrupt events may occur by design or may occur by accident while performing a SSW method. Due to the interrupt events, wedges that are written before and after the interrupt may be out of alignment and/or overlap. Also, signatures of the subsequently written servo sedges may not match or follow the signatures of previously written servo wedges. Note that servo wedges may be referred to as sector servo tracks and/or finals. An example of servo wedge misalignment is shown in FIG. 1.

In FIG. 1, a first set of previously written sector servo tracks X−2, X−1 and X are shown. Track X is the last track that was written prior to an interrupt event. Sector servo tracks X+1, X+2 and X+3 are written subsequent to tracks X−2, X−1 and X and after the interrupt event. Each of the tracks may have an automatic gain control (AGC) field, a synchronization field S, a gray-coded track number (Gray Code), and a set of fine-positioned offset bursts (A-D). The offset bursts are configured in an echelon across a sector servo track. Each of the sector servo tracks may also include an index mark I.

An interrupt event refers to a pause in sector servo writing. The interrupt event may be by design, due to a power failure or a reboot, or due to other causes. Radial, phase and timing variations in a disk drive system may be caused by changes in spindle speed, read/write head motion, temperature changes, tolerance changes, and/or other operating variations. The radial, phase and timing variations may cause servo wedge misalignment. As shown, track X+1 is out of alignment with track X in both a radial direction and in a circumferential direction, as denoted by arrows 4 and 6, respectively. The radial direction 4 is associated with the extension of servo wedges between inner and outer diameters of a disk. The circumferential direction 6 is associated with time and a position along a written servo wedge. The misalignment can result in track overlap, as shown, or in track gaps. Track X+1 is shown as overlapping track X in an overlapping area 8. Track gaps refer to areas of separation between consecutive tracks.

Written tracks have associated signatures with repeatable components. The repeatable components include direct current (DC) and alternating (AC) repeatable run-out components. The systems and methods described below detect and account for both the repeatable DC and AC components of servo wedges written prior to an interrupt event. In accounting for the repeatable DC and AC components, the systems and methods provide accurate alignment of servo wedges written after an interrupt event and relative to previously written servo wedges. This provides completion of a previously written servo pattern and seamless consecutive servo pattern writing.

Figure 2:
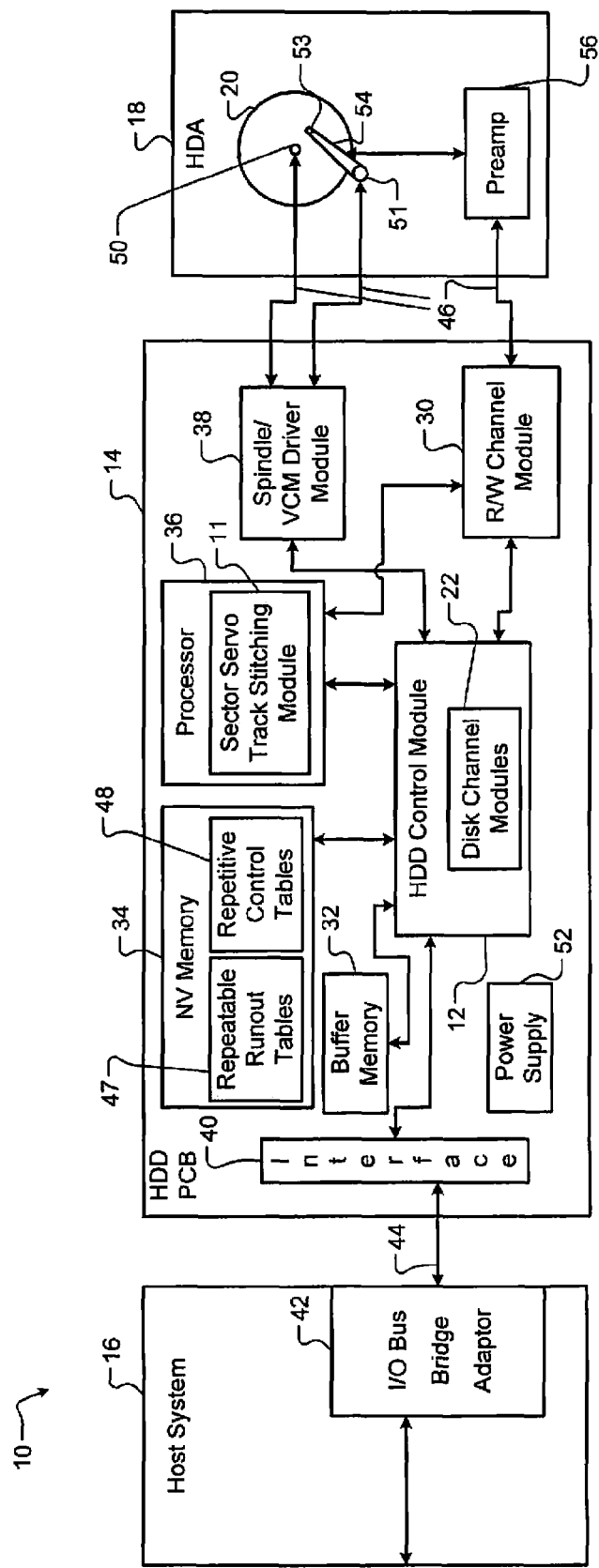
FIG. 2 is a functional block diagram of a hard disk drive system incorporating a sector servo track stitching module in accordance with an embodiment of the present disclosure.

Referring now to FIG. 2, a functional block diagram of a hard disk drive (HDD) system 10 incorporating a sector servo track stitching module 11 is shown. Although HDDs are primarily shown and described herein, the embodiments disclosed below may apply to other rotating data storage devices, such as a compact disc (CD) drive, a digital versatile disc (DVD) drive or a high definition/high data storage disc drive. The HDD system 10 includes a HDD printed circuit board (PCB) 14 that is coupled to a host system 16 and a hard disk assembly (HDA) 18. The HDD PCB 14 reads from and writes to sectors of a rotating storage medium 20 of the HDA 18 via a HDD control module (HDC) 12 and a processor 36. The HDC 12 and the processor 36 write servo wedges to the rotating storage medium 20 in a seamless manner via a read/write (R/W) channel module 30 and a spindle/voice coil motor (VCM) driver module 38. The HDC 12 includes a disk channel modules 22 through which it performs read/write tasks.

The HDD PCB 14 also includes the read/write channel module 30 and a servo data read/write control system 31 with the sector servo track stitching module 11. The read/write channel module 30 processes data received from and transmitted to the HDA 18. The servo data read/write control system 31 provides seamless stitching of concentric and consecutive servo wedges in the event of an interrupt event. The sector servo track stitching module assures proper written alignment and positioning of servo data relative to previously written servo data.

The HDD PCB 14 also includes a buffer memory 32, a nonvolatile memory 34, a processor 36, and the spindle/VCM driver module 38. The HDC 12 controls components of the HDA 18 and communicates with an external device, such as the host system 16 via an I/O interface 40. The I/O interface 40 is in communication with an I/O bus bridge adaptor 42 of the host system 16 via an advanced technology attachment (ATA) bus 44. The host system 16 may include a computer, a multimedia device, a mobile computing device, etc. The I/O interface 40 may include wireline and/or wireless communication links.

The HDC 12 may receive data from the HDA 18, the read/write channel module 30, the buffer memory 32, the nonvolatile memory 34, the processor 36, the spindle/VCM driver module 38, and/or the I/O interface 40. The read/write channel module 30 and the spindle/VCM driver module 38 are in communication with the HDA 18 via HDA communication lines 46. The processor 36 may process the data, including encoding, decoding, filtering, and/or formatting. The processed data may be output to the HDA 18, the read/write channel module 30, the buffer memory 32, the nonvolatile memory 34, the processor 36, the spindle/VCM driver module 38, and/or the I/O interface 40.

The HDC 12 may use the buffer memory 32 and/or the nonvolatile memory 34 to store data related to the control and operation of the HDD 10. The buffer memory 32 may include dynamic random access memory (DRAM), synchronous DRAM (SDRAM), and/or other memory types. The nonvolatile memory 34 may include flash memory (including NAND and NOR flash memory), phase change memory, magnetic RAM, and/or multi-state memory, in which each memory cell has more than two states. The buffer memory 32 and/or the nonvolatile memory 34 may include repeatable run-out tables 47 and/or repetitive control tables 48. The processor 36 performs processing that is related to the operation of the HDD 10. The spindle/VCM driver module 38 controls a spindle motor 50 and a VCM 51. The spindle motor 50 rotates the storage medium 20. The spindle motor 50 may rotate the storage medium 20 at a fixed speed during read/write operations. The HDD PCB 14 also includes a power supply 52 that provides power to the components of the HDD 10.

The HDA 18 includes the rotating storage medium 20. The rotating storage medium 20 may be a magnetic medium or one or more platters. The platters are coated with magnetic layers. The magnetic layers store positive and negative magnetic fields that represent binary 1's and 0's. The HDA 18 further includes a read/write device, such a read/write device (head) 53. The read/write device 53 may be arranged on one or more actuator arms 54, as shown, and read and write data on the rotating storage medium 20. The read/write device 53 includes a write element such as an inductor that generates a magnetic field. The read/write device 53 also includes a read element (such as a magneto-resistive (MR) element) that senses the magnetic field on the storage medium 20. The actuator arm 54 is positioned, for example using a voice coil actuator, a stepper motor or any other suitable actuator, based on control signals generated by the spindle/VCM driver module 38.

Additionally, the HDA 18 includes the spindle motor 50 that rotates the rotating storage medium 20 and the VCM 51 that actuates the actuator arm 54. The actuator arm 54 moves relative to and is used to read and/or write data to or from the storage medium 20. A preamplifier device 56 amplifies signals generated by the read/write device 53 during read operations and provides signals to the read/write device 53 during write operations.

When reading data, the preamplifier device 56 amplifies low level signals from the read element and outputs the amplified signal to the read/write channel module 30. When writing data, a write current is generated which flows through the write element of the read/write module 30. The write current is switched to produce a magnetic field having a positive or negative polarity. The positive or negative polarity is stored by the storage medium 20 and is used to represent data.

Figure 3:
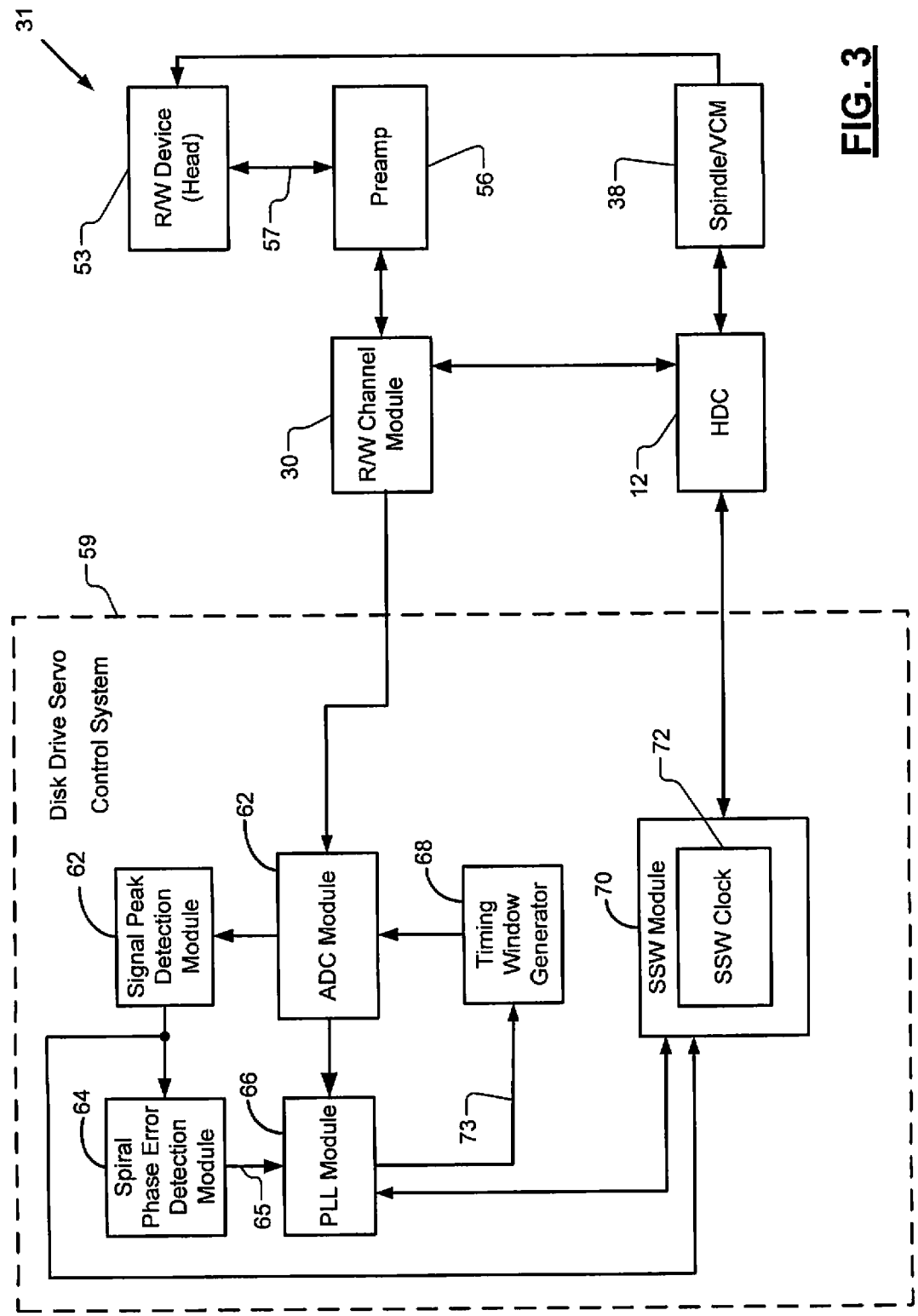
FIG. 3 is a functional block diagram of a servo data read/write control system in accordance with an embodiment of the present disclosure.

Referring now also to FIG. 3, a functional block diagram of the servo data read/write control system 31 is shown. The read/write control system 31 includes a disk drive servo control system 59 that controls disk drive servo operation and performs spiral calibration, detection, writing and reading. The read/write control system 31 maps and determines the position of each spiral and then uses that information as a reference to track and seek spirals. The disk drive servo control system 59 includes an analog-to-digital converter (ADC) module 60, a signal peak detection module 62, a spiral phase error detection module 64, a phase-locked loop (PLL) module 66, a timing window generator 68, and an SSW module 70.

Initially, the HDC 12 issues a spin up command to the spindle/VCM driver 38. The spindle/VCM driver 38 starts the spindle motor 50 and spins up a spindle with one or more platters to a predetermined speed. Then the HDC 12 issues a head load command to the spindle/VCM driver 38 that moves the actuator arm 54. The read/write device 53 is mounted on the actuator arm 18. When conventional seed tracks are prewritten on the platters, the read/write device 53 seeks to an initial seed track. When conventional seed tracks are not prewritten, the SSW module commands the read/write device 53 to go to an approximate area of the platters and search for spirals. This is accomplished by biasing the actuator arm 54 by applying a small constant current such that the actuator arm 18 moves to an approximate area of the platters, usually an inner diameter (ID) of the disk.

As the platters spin, the read/write device 53 encounters reference spirals. The preamplifier 56 amplifies a spiral signal 57 read by the read/write device 53. The R/W channel module 30 filters and forwards the spiral signal to the ADC module 60. The ADC module 60 converts the spiral signal from analog to digital format. The signal peak detection module 62 detects the peak of the spiral signal. The spiral signal includes sync marks generated by RSSs. The RSSs are prewritten on the platters using an RSS clock. The phase error detection module 64 minimizes phase error between the sync marks and generates a phase correcting signal 65.

The PLL module 66 uses the phase correcting signal 65 to synchronize a self-servo write (SSW) clock 72 to the RSS clock derived from the spiral signals. The SSW module 70 uses the SSW clock 72 to write servo data. Additionally, the PLL module 66 generates a control signal 73 for the timing window generator 68. The timing window generator 56 uses the control signal 73 to position a signal detection window at different areas of a digitized spiral signal until the spiral peak is detected.

Referring now to FIG. 4, a functional block diagram illustrating a radial servo wedge alignment system 100 is shown. The radial alignment system 100 includes a digital servo module 102 that controls the spindle/VCM 38. A driver output signal 104 from the spindle/VCM 38 is summed, via a summer 105, with a feedforward compensation signal 106, which is received from a first compensation module 108. Summed signal output 108 from the summer 105 is provided to a spiral position detection module 110 and to a wedge position detection module 112. The spiral position detection module 110 determines radial position of the read/write device 53 over a spiral and thus is used to radially position the read/write device 53. The wedge position detection module 112 determines radial position information of a current servo wedge and generates a first repeatable run-out (RRO) signal $RRO(t)_1$. The first RRO signal $RRO(t)_1$ has a radial DC signature component and a radial AC signature component. The DC component refers to radial position of the current servo wedge relative to the spiral. The AC component refers to an average radial position error of each sector servo track relative to spiral servo data.

A first spectral filter 116 is coupled to the wedge position detection module 112 and filters out preselected frequencies of the first RRO signal $RRO(t)_1$. The first spectral filter 116 retains frequency components of interest of a signal and provides the time domain representation of that signal. The first spectral filter 116 may perform as a low pass filter, a high pass filter, a notch filter, or other filter. The first spectral filter 116 may be used, for example, to remove noise or other high frequency components. A control module, such as the HDC 12, the processor 36, or some other control module may select frequencies to filter out in the first spectral filter 116. The first spectral filter 116 or the control module may have a user input for selection of the frequencies to be filtered. The first spectral filter 116 generates a first filtered RRO signal $RRO'(t)_1$ based on the first RRO signal $RRO(t)_1$.

The first compensation module 108 generates the feedforward signal 106 based on the first filtered RRO signal $RRO'(t)_1$. The feedforward signal 106 is generated such that a new or subsequently written servo wedge continues the signature of a last or previously written servo wedge. This minimizes difference between radial RRO of a last written servo wedge, written prior to an interrupt event, and radial RRO of a servo wedge written adjacent and subsequent to the last written servo sedge.

The spiral position detection module 110 and the wedge position detection module 112 are used to radially align tracks written before and after an interrupt event and to minimize the average radial position error of each servo wedge. This is described in further detail below.

Referring to FIG. 5, a functional block diagram illustrating a servo wedge phase and timing alignment system 130 is shown. The phase/timing system 130 includes the PLL module 66, which is coupled to the phase error detection module 64. The PLL module 66 receives the phase correcting signal 65, from the phase error detection module 64, and a second compensation signal 132, from a second compensation module 134. The phase error detection module 64 determines timing error derived from a spiral track and is used to circumferentially position the read/write device 53. Time difference between synchronization (sync) marks on a spiral track is used to derive timing error. The PLL module 66 generates a SSW clock signal 136 based on the phase correcting signal 65 and the second compensation signal 132.

A wedge servo address mark (SAM) detection module 138 generates a phase/timing RRO signal $RRO(t)_2$ based on sync marks associated with servo wedge patterns. The second RRO signal $RRO(t)_2$ has a circumferential DC signature component and a circumferential AC signature component. The circumferential DC component refers to an average circumferential position of a current servo wedge relative to the spiral. The AC component refers to an average circumferential position error of each sector servo track relative to spiral servo data. A second spectral filter 140 filters the phase/timing RRO signal $RRO(t)_2$ to generate a second filtered RRO signal $RRO'(t)_2$. The second filtered RRO signal $RRO(t)_2$ is received by the second compensation module 134, which generates the second compensation signal 132. An example of a spectral filter that may be used for the first and/or second spectral filters 116, 140 is shown with respect to the embodiment of FIG. 6.

The second compensation signal 132 is feedforward to the PLL module 66. The second compensation signal 132 is used by the PLL module 66 to minimize difference between circumferential RRO of the last written servo wedge and circumferential RRO of the subsequently written servo wedge.

The spiral phase error detection module 64 and the wedge SAM detection module 138 are used to circumferentially align servo wedges that are before and after an interrupt event and to minimize the average circumferential position error of each servo wedge. This is also described in further detail below.

Referring to FIG. 6, a functional block diagram of an example spectral filter 150 is shown. The spectral filter 150 includes a Fast Fourier Transform (FFT) module 152, a frequency selection module 154 and an inverse FFT module 156. An RRO signal RRO(t) that is in the time domain is received and transformed into a frequency domain representation by the FFT module 152. The frequency selection module 154 filters out one or more selected frequencies to generate a filtered signal 158. The filtered signal 158 is passed through the inverse FFT 156 to generate a spectrally filtered version of the RRO signal RRO(t), specifically the filtered RRO signal RRO'(t).

Figure 7:
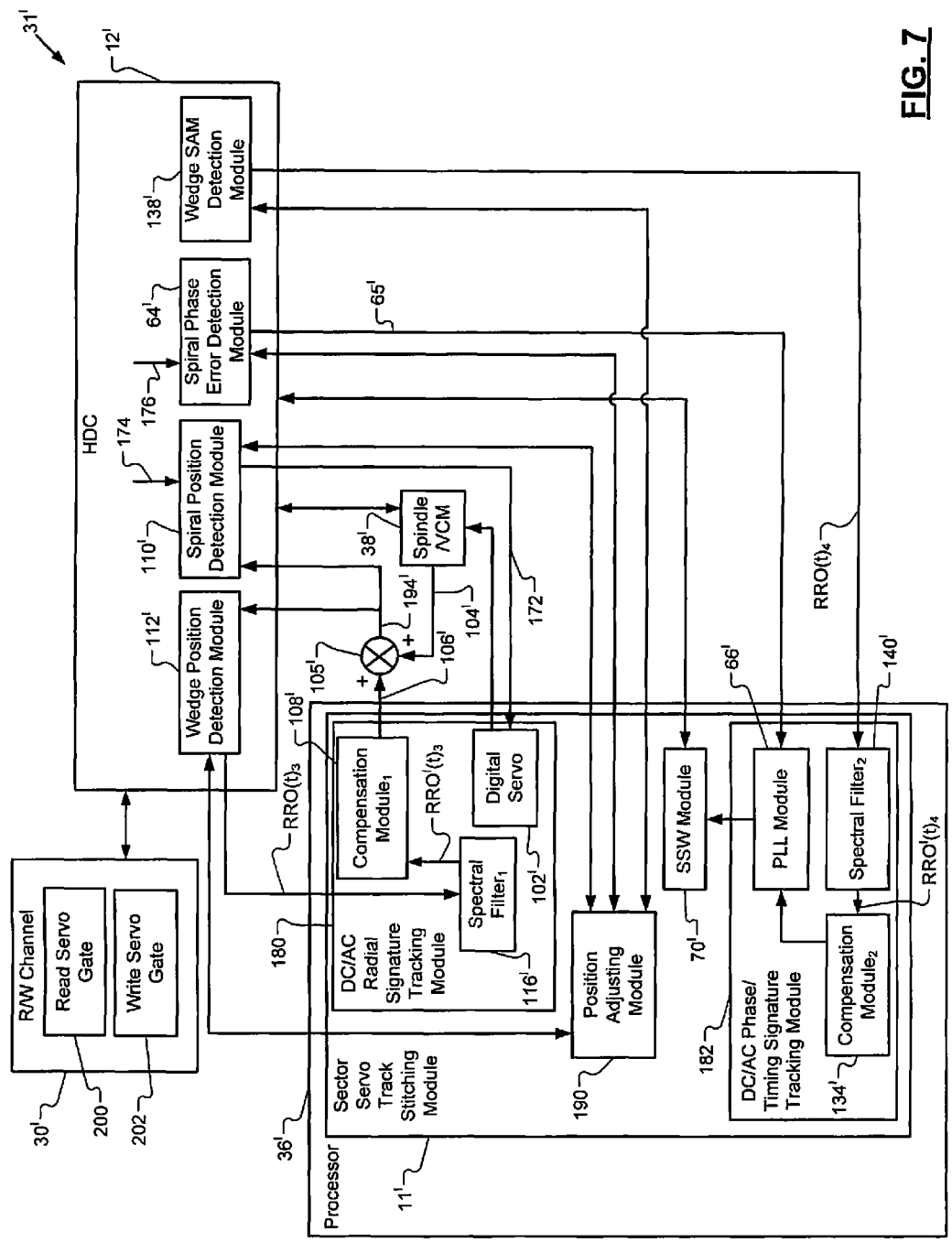
FIG. 7 is a functional block diagram of a read/write control system that includes an example sector servo track stitching system in accordance with an embodiment of the present disclosure.

Referring to FIG. 7, a functional block diagram of a read/write control system 31' that includes an example sector servo track stitching system 170 is shown. The read/write control system 32' includes an HDC 12', a processor 36', a read/write channel 30' and a spindle/VCM 38'. Note that the arrangement of modules and devices disclosed with respect to the embodiment of FIG. 7 is provided and meant to illustrate one possible implementation. Although some of the modules and devices are shown as part of the HDC 12' and others are shown as part of the processor 36', the modules and devices may be located elsewhere, combined, or separate from the HDC 12' and the processor 36'. Also, modules and devices located in the HDC 12' may be located in the processor 36' and vice versa. The HDC 12' detects track information and spiral phase error. The processor 36' determines servo wedge signatures and patterns based on the sector servo and spiral track information and spiral phase error. The processor 36' adjusts write operations of servo wedges based on the servo wedge signatures and patterns.

The HDC 12' includes a wedge position detection module 112', a spiral position detection module 110', a spiral phase error detection module 64' and a wedge SAM detection module 138'. The wedge position detection module 112' determines servo wedge information including DC and AC radial signatures position information before and after an interrupt event. The wedge position detection module generates a radial RRO signal $RRO(t)_3$.

The spiral position detection module 110' determines servo wedge information, including DC and AC radial signature position information, pertaining to tracks written before and after an interrupt event. The spiral position detection module 110' generates a VCM control signal 172 based on a first reference input 174, which is indicative of a radial track destination for a read/write head. The first reference input 174 may be compared to the VCM control signal to determine spiral position error.

The spiral phase error detection module 64' minimizes phase error between sync marks and generates a phase correcting signal 65'. The spiral phase error detection module 64' may receive a second reference input 176, which is indicative of a circumferential track destination for a read/write head. The wedge SAM detection module 138' generates a phase/timing RRO signal $RRO(t)_4$.

The processor 36' includes a sector servo track stitching module 11' with a DC/AC radial signature tracking module 180 and a DC/AC phase/timing signature tracking module 182. The radial signature tracking module 180 compensates for differences in DC and AC radial repeatable patterns. The phase/timing signature tracking module 182 compensates for differences in DC and AC circumferential repeatable patterns. The radial signature tracking module 180 includes a digital servo 102', a first spectral filter 116' and a first compensation module 108'. The phase/timing signature tracking module 182 includes a PLL module 66', a second spectral filter 140' and a second compensation module 134'.

The sector servo track stitching module 11' also includes a position adjusting module 190 and a SSW module 70'. The position adjusting module 190 compares DC radial and circumferential relative position differences between servo wedges written prior to an interrupt event and test tracks written after the interrupt event. The position adjusting module 190 may be part of the signature compensation modules 180, 182, the wedge position detection module 112', the wedge SAM detection module 138' or may be a separate module, as shown.

The radial RRO signal $RRO(t)_3$ is received by the first spectral filter 116'. Upon filtering, the radial RRO signal $RRO(t)_3$ is received by the first compensation module 108'. The first compensation module 108' generates a feedforward signal 106', which is summed with a VCM driver output signal 104', via a summer 105' to generate a summed output signal 194. The summed output signal 194 is provided to the wedge position detection module 112' and the spiral position detection module 110'.

The phase/timing RRO signal $RRO(t)_4$ is received by the second spectral filter 140'. Upon filtering, the filtered phase/timing RRO signal $RRO'(t)_4$ is received by the second compensation module 134'. The second compensation module 134' generates a second compensation signal 132' based on the filtered phase/timing RRO signal $RRO'(t)_4$. The PLL module 66' controls timing in the SSW module 70' based on the second compensation signal 132'.

The read/write channel 30' includes a read servo gate 200 and a write servo gate 202. The read and write servo gates 200, 202 are enabled in order to read or write servo data from a spiral. The servo gates 200, 202 may be enabled or disabled via the HDC 12'.

Figure 8:
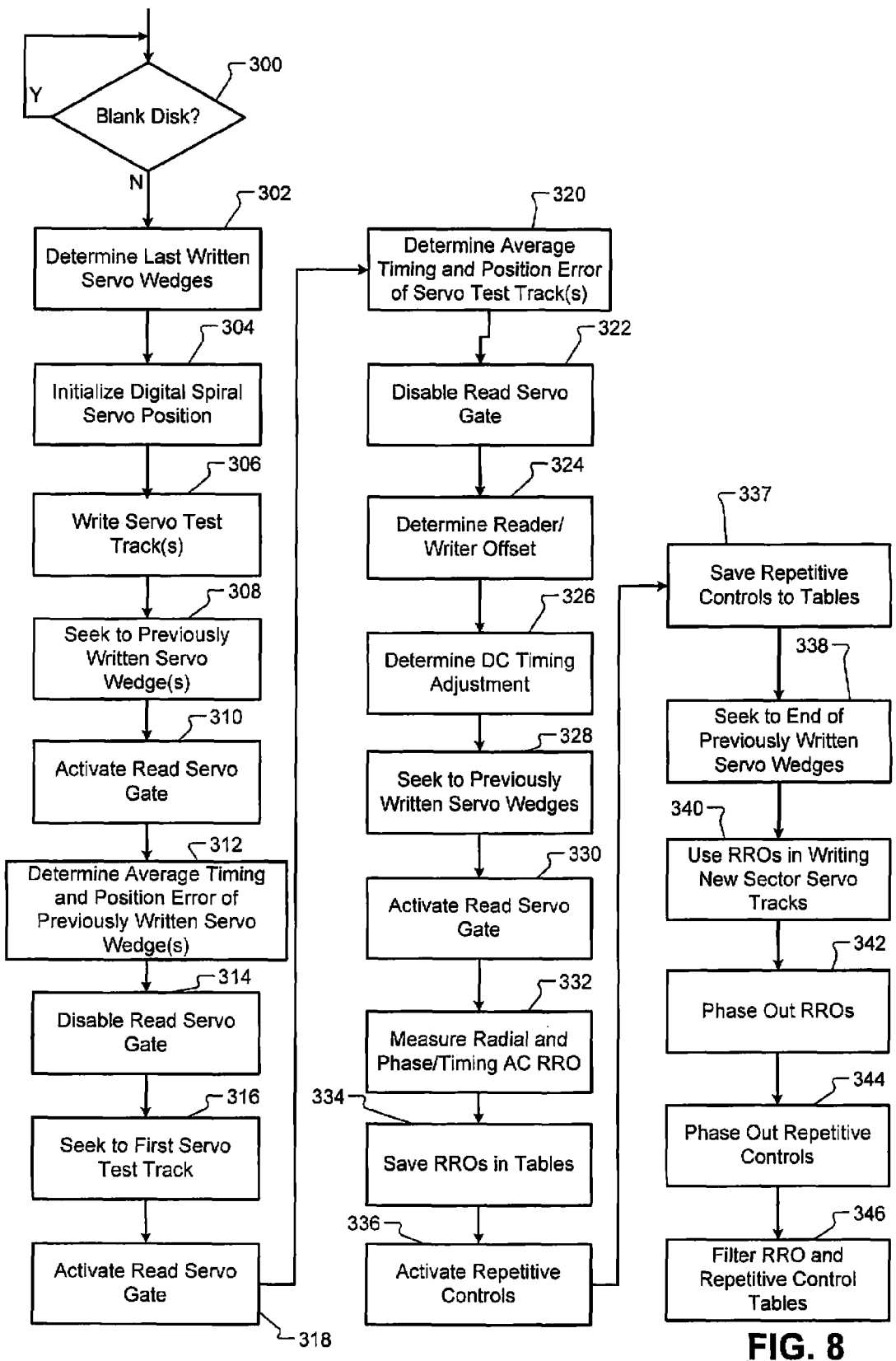
FIG. 8 is a flowchart illustrating a method of stitching servo wedges in accordance with an embodiment of the present disclosure.

Referring to FIG. 8, a logic flow diagram illustrating a method of stitching sector servo tracks is shown.

In step 300, a control module, such as the HDC or the processor 36, determines whether a current rotating medium, such as a disk, is blank. When the rotating medium is not blank, the control module proceeds to step 302.

In step 302, the control module determines the last written sector servo tracks, for example, sector servo track X. The last written sector servo track may be previously written based on a partial spiral section, as opposed to a spiral that extends radially across a whole disk. A head actuator, such as the spindle/VCM 38, locks on to spiral tracks and seeks to an area that includes good sector servo tracks that were written before an interrupt event.

In step 304, a spiral servo position is calibrated and initialized based on servo wedge information associated with a last written sector servo track, such as the sector servo track X.

Figure 9:
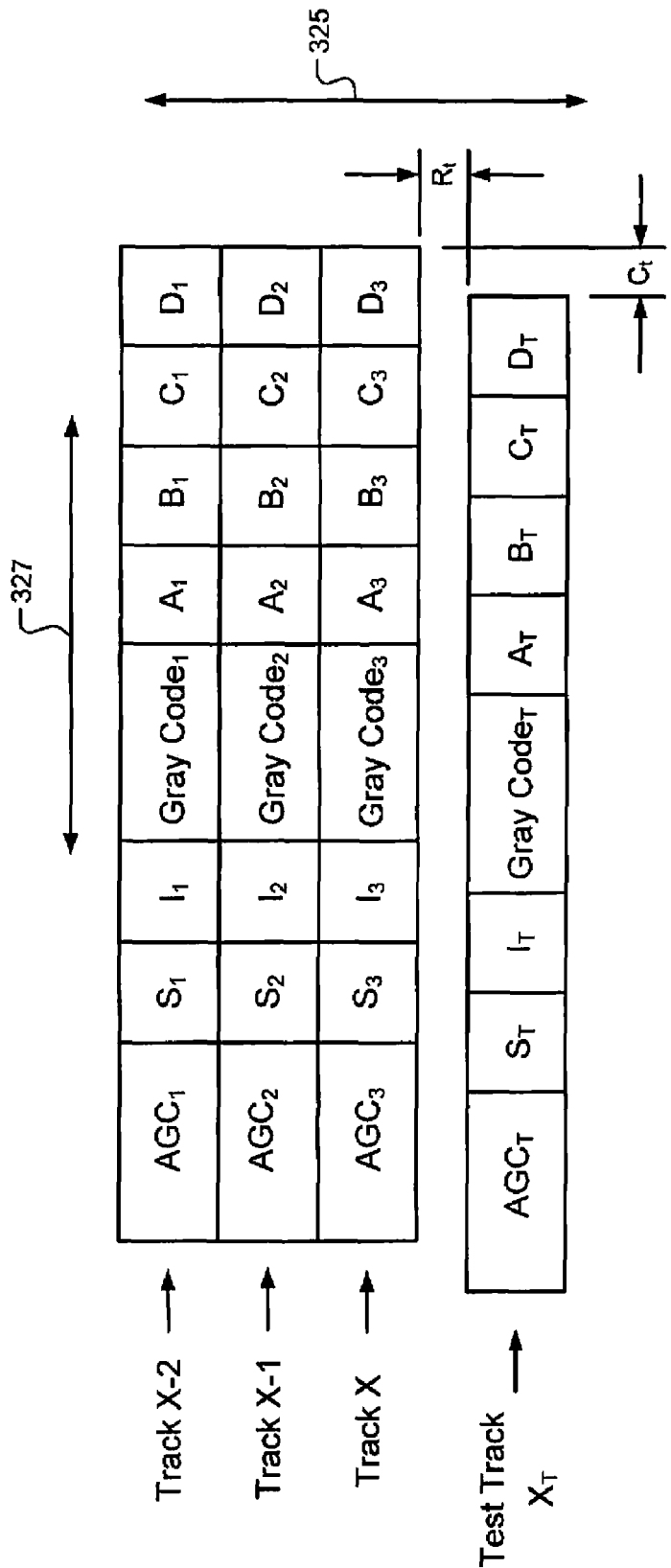
FIG. 9 is a servo wedge diagram illustrating an example servo test track positioned relative to previously written sector servo tracks in accordance with an embodiment of the present disclosure.

In step 306, servo test tracks are written after the last sector servo track. A magnetic write head, such as the read/write device 53, is positioned using spiral servo information over to a blank area subsequent to the last written sector servo track. The write head may be positioned a preselected number of sector servo tracks from the last written sector servo track. In the blank area one or more servo test tracks are written. FIG. 9 shows a track diagram illustrating an example servo test track $X_T$ positioned relative to previously written sector servo tracks X–2, X–1, X.

In step 308, the control module seeks to the previously written servo wedges, written prior to an interrupt event (previously written tracks), such as the sector servo tracks X–2, X–1, X.

In step 310, the read servo gate 200 is enabled to permit reading from the spiral. The read servo gate 200 may be activated by generating an interrupt from a rising edge of a programmable SSW window from hardware. An interrupt handler may be used to initialize a servo write control store (WCS), thereby controlling servo gate timing. This allows for the read servo gate 200 to be opened at the proper time and a wedge of interest to be located, regardless of window drift.

In step 312, a sector servo track stitching module, such as the sector servo track stitching module 11, determines average radial position and phase/timing errors for the previously written tracks based on the wedge information associated therewith. The previously written tracks are used as reference tracks upon which to compare servo test tracks. The average radial position and phase/timing errors are determined relative to the spiral servo. A SSW clock, such as the SSW clock 72, is phase locked to spiral track sync marks. The average radial position and phase/timing errors may be stored in a memory, such as one of the memories 32, 34. In step 314, the read servo gate 200 is disabled.

In step 316, the control module seeks to the first written servo test track. In step 318, the read servo gate 200 is again enabled. In step 320, the control module determines average position and phase/timing error of the servo test tracks relative to the spiral. The average position and phase/timing errors of the spiral test tracks may be determined by a wedge position detection module and a wedge SAM detection module, such as the wedge position detection module 112 and the wedge SAM detection module 138. The average position and phase/timing errors of the servo test tracks is determined relative to sync mark time stamps associated with the servo test tracks. The average phase/timing error may be measured by averaging phase errors over each sector servo track, which defines wedge based repeatable phase errors. The repeatable phase errors may be used as a repeatable phase reference for a SSW module to follow when writing new sector servo tracks. The repeatable phase errors also allow a PLL module 66, such as the PLL module, to minimize timing errors. The average position and phase/timing errors may also be stored in a memory. In step 322, the read servo gate 200 is disabled.

In step 324, a read/writer offset is determined based on the radial position averages determined in steps 312 and 320. The reader/writer offset may be set equal to the difference between the average radial positions of the previously written tracks and first written servo test track. The average radial position errors for the previously written tracks may be used as a radial position reference upon which to compare average radial position errors for servo patterns. The reader/writer offset refers to the radial misalignment between the previously written tracks and the servo test tracks, which correspond to the track offset between read and write elements of a read/write device. The reader/writer offset unit of measure is tracks or, in other words, is measured in terms of tracks. A read/writer offset may be, for example, a fraction or multiple of a radial track dimension.

In FIG. 9, the servo test track $X_T$ has a reader/writer offset of approximately ½ $R_t$, where $R_t$ is a radial dimension of a single track. The radial direction is denoted by arrow 325. In one embodiment, the reader/writer offset is determined by a position adjusting module, such as the position adjusting module 190, and compensated for by the control module. In another embodiment, the reader/writer offset is determined by the wedge position detection module and compensated for with a first compensation module, such as the first compensation module 108.

The reader/writer offset may be determined by comparing a difference between a center location of a servo test track measured by decoding servo bursts and a spiral location of last written sector servo track, which has been positioned in order to get to the test track center. Use of the track center prevents linearity aspects from affecting measurement accuracy.

In step 326, the control module determines phase/timing position errors between the servo test tracks and the previously written tracks. The average phase/timing positions, determined in steps 312 and 320, are compared to provide the phase/timing position error. The average phase/timing position errors for the previously written tracks may be used as a circumferential position reference upon which to compare average phase/timing position errors of the servo test tracks.

In FIG. 9, the servo test track $X_T$ has a phase/timing position error of approximately ½ $C_t$, where $C_t$ is a circumferential dimension of a wedge data entry. The circumferential direction is denoted by arrow 327. In one embodiment, the phase/timing position errors are determined by a position adjusting module, such as the position adjusting module 190, and compensated for by the control module. The phase/timing position errors may be determined by a wedge SAM detection module, such as the wedge SAM detection module 138, and compensated for with a second compensation module, such as the second compensation module 134. The phase/timing position errors may be determined by comparing average phase errors defined by time stamps and references at the locations of the last written sector servo tracks and the servo test tracks.

In step 328, the control module seeks to the previously written tracks. In step 330, the read servo gate is enabled. In step 332, the radial and phase/timing AC signature RRO components of one or more of the previously written tracks are measured. AC repeatable position errors may be measured by averaging position errors over each servo sector on servo bursts on the previously written tracks. The sector servo track based repeatable errors are used as radial and circumferential references of which an actuator tracking servo loop may follow when new tracks are written.

In step 334, the AC signature RRO components are saved in RRO tables within a memory, such as the RRO tables 47. In step 336, repetitive error compensation controls are activated to minimize residual RROs that are not canceled by the above RRO feed-forward tables. The repetitive controls minimize any residual repetitive phase and radial errors resulting from the RRO feed-forward in servo loop, which may be bandwidth limited. In step 337, the repetitive controls are saved in repetitive control tables, such as in the repetitive control tables 48. In step 338, the control module seeks to an end of the previously written tracks.

Figure 10:
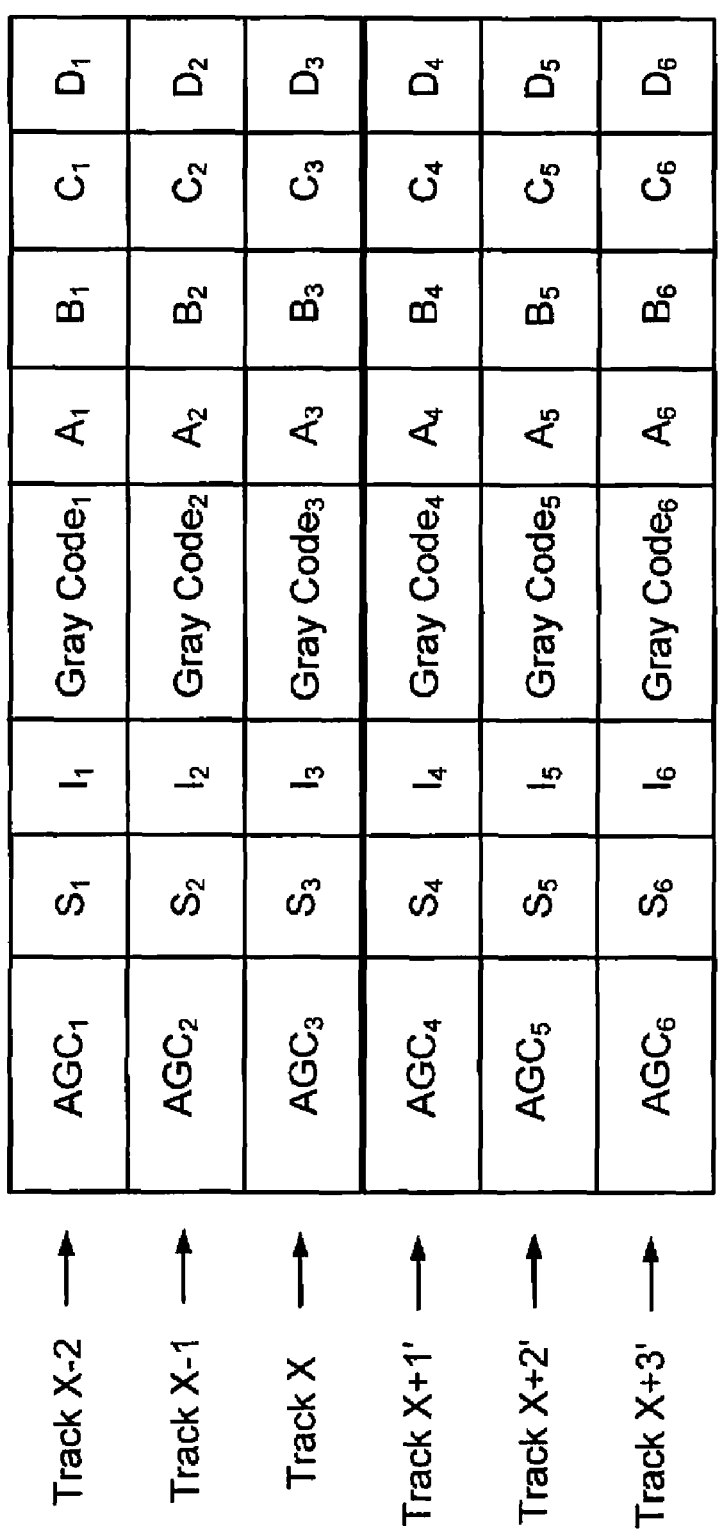
FIG. 10 is a servo wedge diagram illustrating wedge alignment in accordance with an embodiment of the present disclosure.

In step 340, the control module writes new tracks subsequent and adjacent to the previously written tracks and overwrites the servo test tracks. The new tracks are written to continue a concentric servo pattern that was initiated by the previously written tracks. The control module accounts for the reader/writer offset, the phase/timing position error, and the AC signature RRO components when writing the new tracks. This accounting allows for the new tracks to be written in a seamless manner with the previously written tracks. The term seamless refers to the radial and circumferential alignment of tracks without overlap thereof or gaps therebetween. An example of new written tracks X+1', X+2', X+3' is shown in FIG. 10. The new written tracks X+1', X+2', X+3' are in radial and circumferential alignment with the previously written tracks. A SSW clock, such as the SSW clock, is calibrated such that the newly written servo sync marks and bursts align coherently with previously written servo sync marks and bursts.

The new written tracks X+1', X+2', X+3' continue and match the DC and AC signature components of the previously written tracks. This minimizes RRO differences between tracks.

In step 342, the AC signature RRO components are phased out over time. The AC signature RRO components are accounted for using a feedforward configuration, such as that shown in FIG. 4. As new written tracks are written, the magnitude of the AC signature RRO components is diminished with each subsequently written track in the SSW process.

In step 344, the repetitive controls are phased out. The repetitive controls are also phase out with each subsequently written track in the SSW process.

In step 346, the information in the RRO tables and the repetitive control tables may be filtered spectrally at spindle harmonic frequencies before being applied to remove non-motion related components. The filtering may be performed via the spectral filters. RRO information can include high frequency resonance from air flow, spindle vibration, and jagged pattern writing, which is difficult to follow. The spectral filters may be used to remove the high frequency components and allow for low frequency motion following.

The above-described steps are meant to be illustrative examples; the steps may be performed sequentially, synchronously, simultaneously, or in a different order depending upon the application.

Referring now to FIGS. 11-14, various exemplary implementations incorporating the teachings of the present disclosure are shown.

Figure 11:
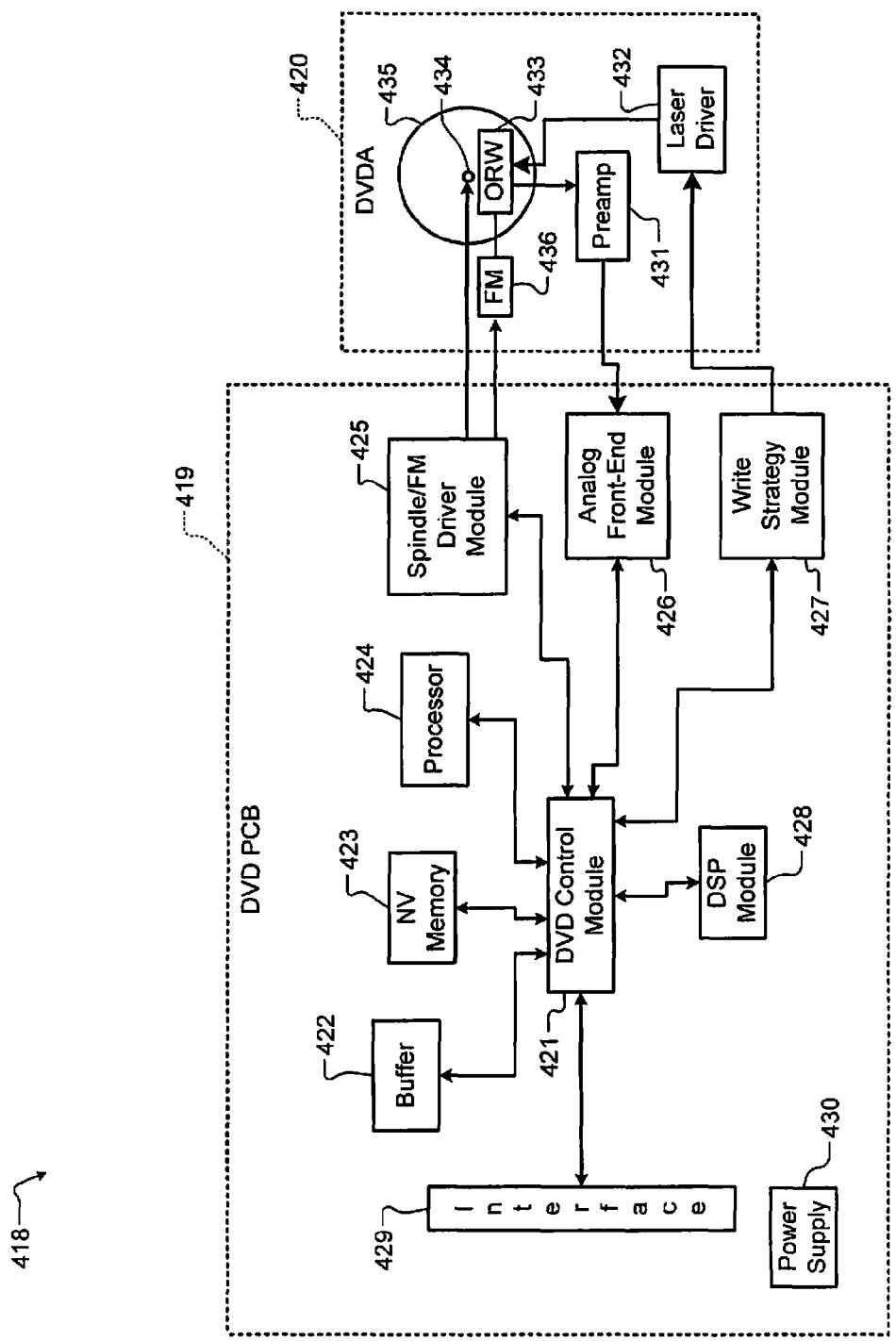
FIG. 11 is a functional block diagram of a DVD drive

Referring to FIG. 11, a functional block diagram of a DVD drive is shown. The teachings of the disclosure can be implemented in a DVD control module 421 and a processor 424 of a DVD drive 418 or of a CD drive (not shown). The DVD control module 421 and processor may write sectional spiral sectors and use the above techniques to write seamless servo wedges. The DVD drive 418 includes a DVD PCB 419 and a DVD assembly (DVDA) 420. The DVD PCB 419 includes a DVD control module 421, a buffer 422, nonvolatile memory 423, the processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Figure 12:
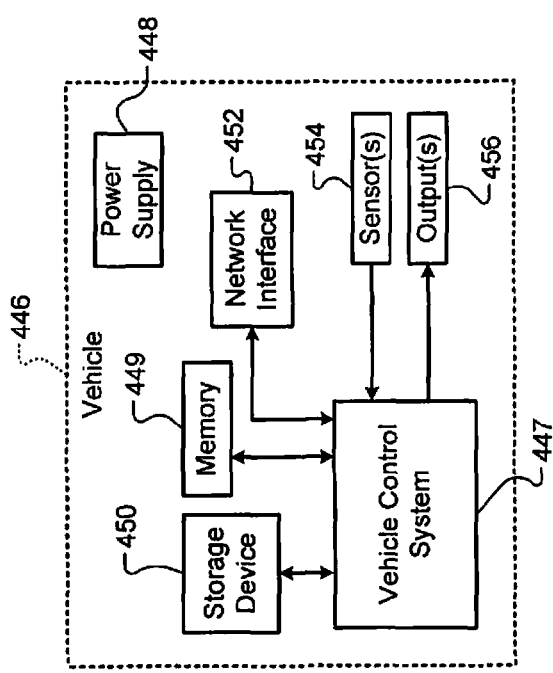
FIG. 12 is a functional block diagram of a vehicle control system.

Referring now to FIG. 12, the teachings of the disclosure may be implemented in a vehicle control system 447 of a vehicle 446. The vehicle control system 447 may write sectional spiral sectors and use the above techniques to write seamless servo wedges in relation to a storage device 450. The vehicle 446 may include the vehicle control system 447, a power supply 448, memory 449, the storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 13:
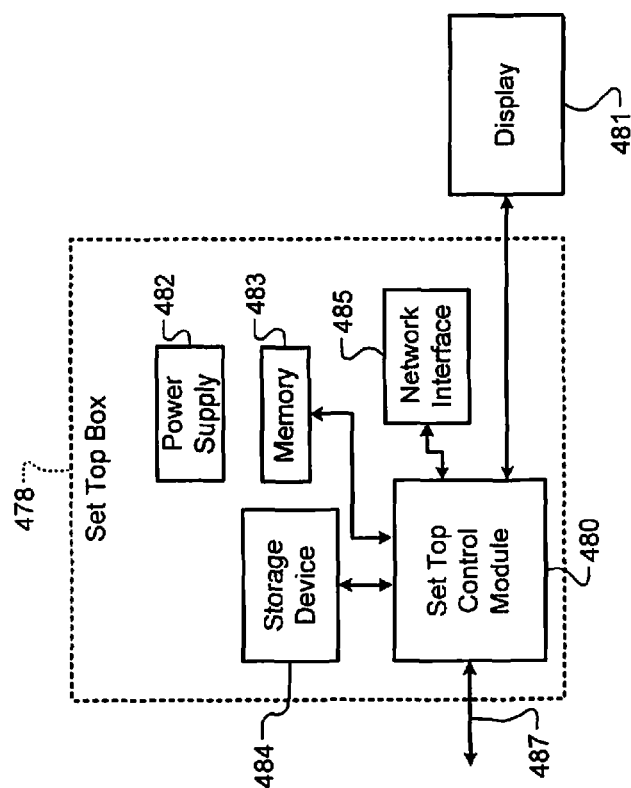
FIG. 13 is a functional block diagram of a set top box.

Referring now to FIG. 13, the teachings of the disclosure can be implemented in a set top control module 480 of a set top box 478. The set top control module 480 and processor may write sectional spiral sectors and use the above techniques to write seamless servo wedges in relation to a storage device 484. The set top box 478 includes the set top control module 480, a display 481, a power supply 482, memory 483, the storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 14:
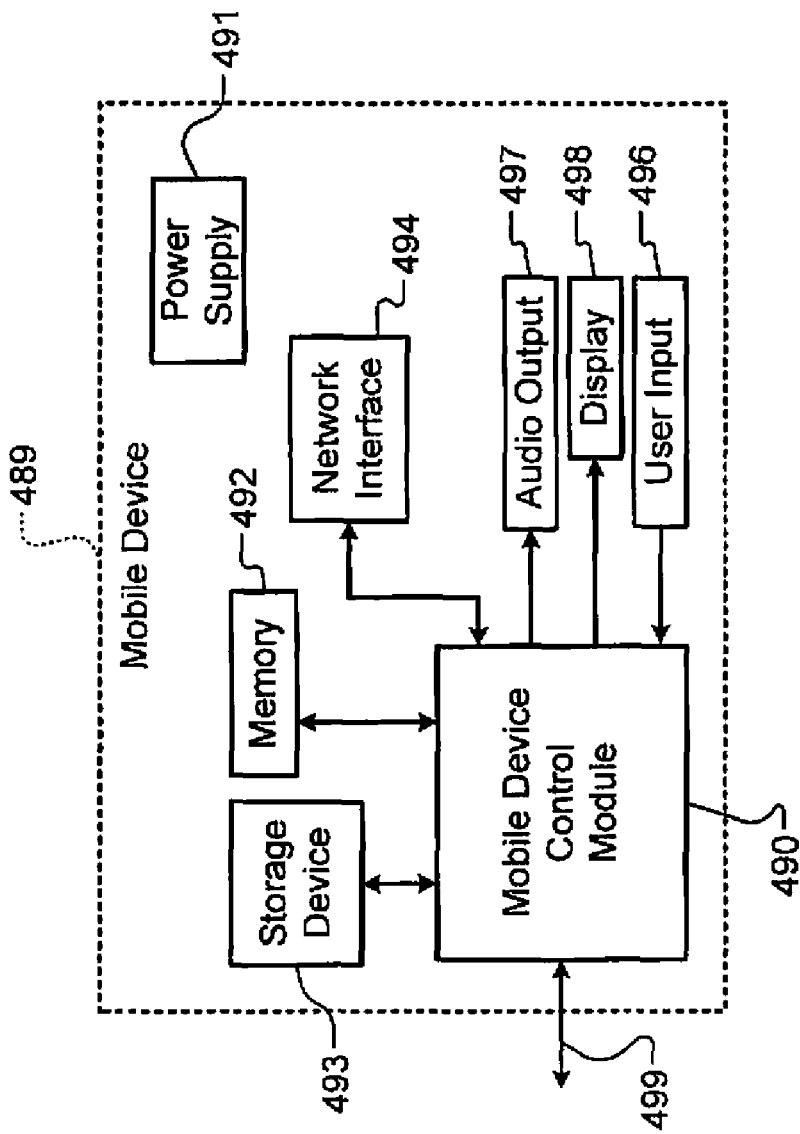
FIG. 14 is a functional block diagram of a mobile device.

Referring now to FIG. 14, the teachings of the disclosure can be implemented in a mobile device control module 490 of a mobile device 489. The mobile device control module 490 and processor may write sectional spiral sectors and use the above techniques to write seamless servo wedges in relation to a storage device 493. The mobile device 489 may include the mobile device control module 490, a power supply 491, memory 492, the storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
   a write head; and
   a control module configured to
   signal the write head to write a servo test track on a rotating medium at a position relative to a reference servo track on the rotating medium, the servo test track to be written on the rotating medium subsequent to an interrupt event, the reference servo track having been written to the rotating medium prior to the interrupt event,
   detect the position of the servo test track relative to the reference servo track; and
   signal the write head to write a new servo track on the rotating medium based on the detected position of the servo test track relative to the reference servo track.

2. The control system of claim 1, wherein the new servo track is written to match a concentric servo pattern associated with the reference servo track.

3. The control system of claim 1, wherein the control module is configured to signal the write head to write the new servo track in alignment with the reference servo track.

4. The control system of claim 1, wherein the control module is configured to signal the write head to write the new servo track adjacent to the reference servo track without a gap being between the reference servo track and the new servo track.

5. The control system of claim 1, wherein the interrupt event comprises a pause in spiral servo writing.

6. The control system of claim 1, further comprising a position detection module configured to detect a radial position of the reference servo track and a radial position of the servo test track,
   wherein the control module signals the write head to write the new servo track on the rotating medium based at least in part on the detected radial position of the reference servo track and the detected radial position of the servo test track.

7. The control system of claim 1, wherein the control module is configured to:
   determine an offset value based on the detected position of the servo test track relative to the reference servo track; and
   signal the write head to write the new servo track on the rotating medium based on the offset value.

8. The control system of claim 1, further comprising a position detection module configured to determine a circumferential position of the reference servo track and a circumferential position of the servo test track,
   wherein the control module signals the write head to write the new servo track on the rotating medium based on the circumferential position of the reference servo track and the circumferential position of the servo test track.

9. The control system of claim 1, further comprising a radial alignment system configured to determine radial repeatable run-out components of the reference servo track,
   wherein the control module signals the write head to write the new servo track on the rotating medium based on the radial repeatable run-out components.

10. The control system of claim 1, further comprising a timing alignment system configured to determine circumferential repeatable run-out components of the reference servo track,
    wherein the control module signals the write head to write the new servo track on the rotating medium based on the circumferential repeatable run-out components.

11. The control system of claim 1, wherein the control module is configured to phase out repeatable run-out compensation with newly written servo tracks.

12. The control system of claim 1, wherein the control module is configured to:
    determine repetitive position errors; and
    signal the write head to write additional servo tracks on the rotating medium based the repetitive position errors.

13. The control system of claim 1, wherein the control module is configured to phase out repetitive position error compensation with newly written servo tracks.

14. The control system of claim 1, wherein the reference servo track is written on the rotating medium based on a partial spiral section.

15. The control system of claim 1, wherein the rotating medium comprises a disk in a hard disk drive, a compact disc, or a digital versatile disc.

16. A method comprising:
    signaling a write head to write a servo test track on a rotating medium at a position relative to a reference servo track on the rotating medium, the servo test track being written subsequent to an interrupt event, the reference servo track having been written prior to the interrupt event;
    detecting the position of the servo test track relative to the reference servo track; and
    signaling the write head to write a new servo track on the rotating medium based on the detected position of the servo test track relative to the reference servo track.

17. The method of claim 16, wherein the new servo track is written to match a concentric servo pattern of the reference servo track.

18. The method of claim 16, wherein the new servo track is written in alignment with the reference servo track.

19. The method of claim 16, wherein the new servo track is written adjacent to the reference servo track without a gap being between the new servo track and the reference track.

20. The method of claim 16, further comprising:
    detecting a radial position of the reference servo track;
    detecting a radial position of the servo test track; and
    signaling the write head to write the new servo track on the rotating medium based at least in part on the detected radial position of the reference servo track and the detected radial position of the servo test track.

* * * * *